June 1, 1926.
R. H. HASSLER
1,586,799
REBOUND CHECK
Filed Dec. 27, 1924   3 Sheets-Sheet 2
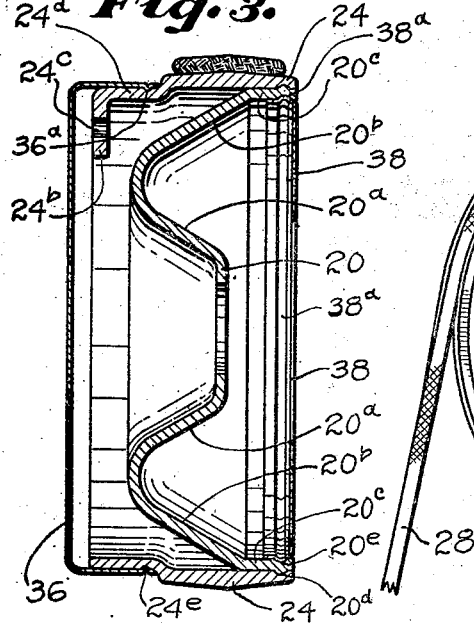
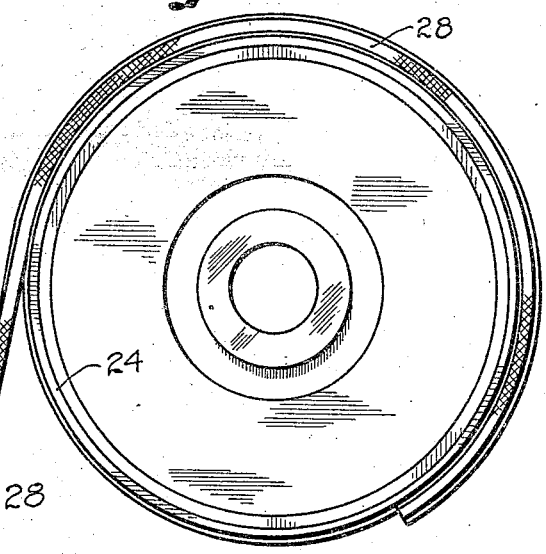
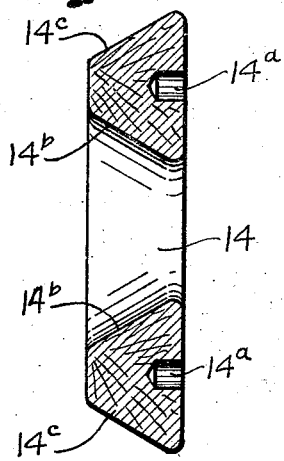
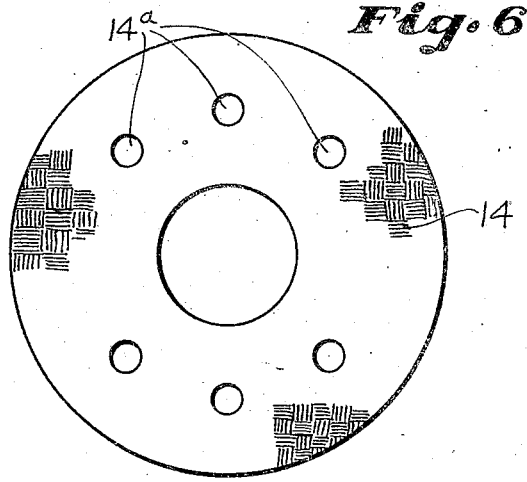
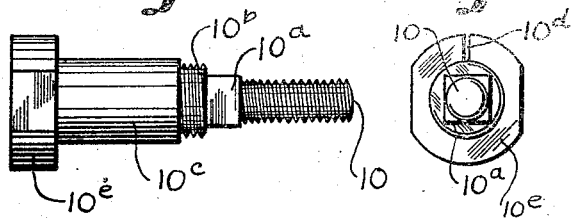
INVENTOR
Robert H. Hassler,
By Raymond F. Buckley.
ATTORNEY June 1, 1926.  
R. H. HASSLER  
REBOUND CHECK  
Filed Dec. 27, 1924

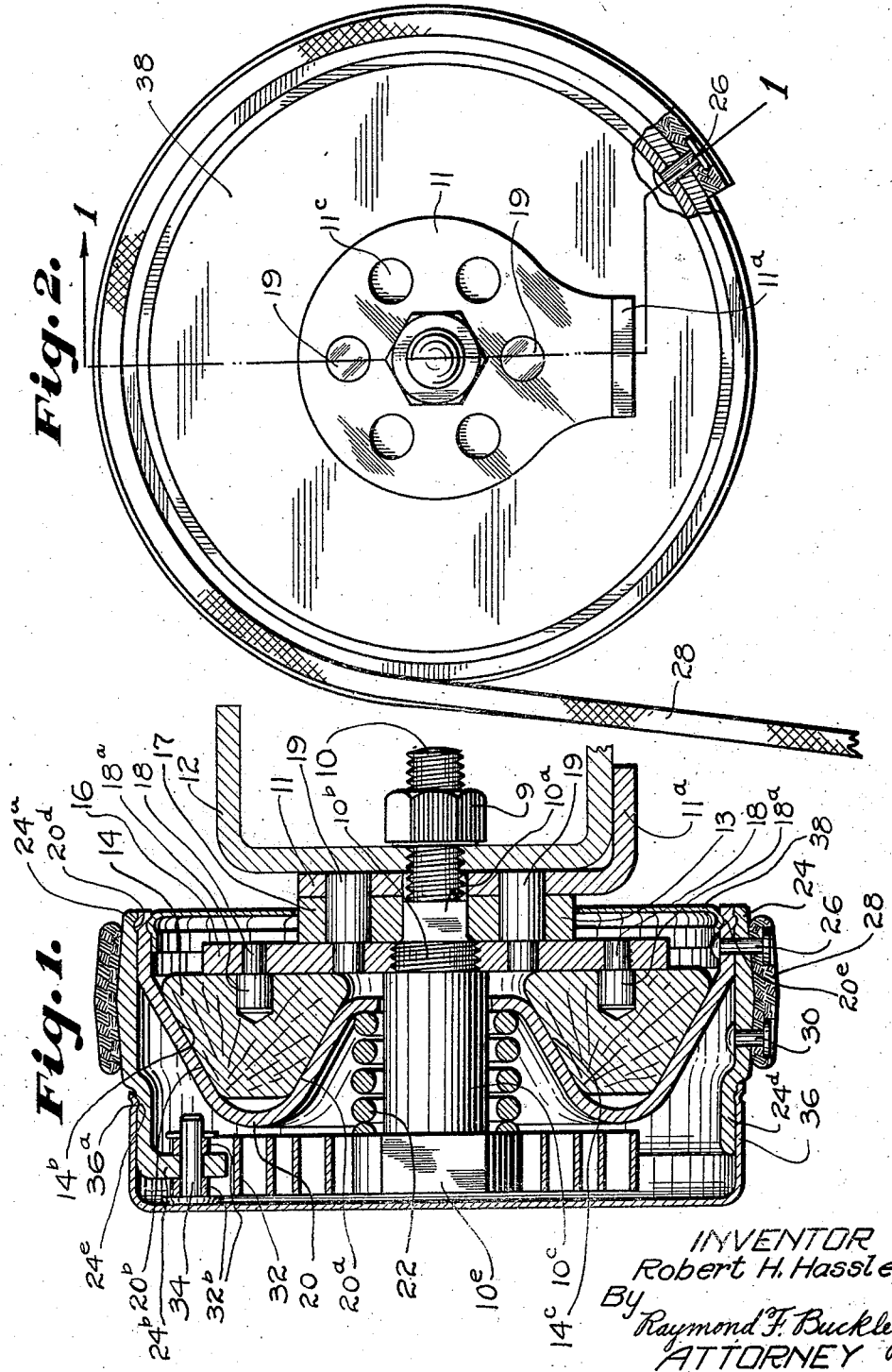

1,586,799

3 Sheets-Sheet 3

INVENTOR  
Robert H. Hassler,  
By Raymond F. Buckley.  
ATTORNEY

Patented June 1, 1926.

1,586,799

UNITED STATES PATENT OFFICE.

ROBERT H. HASSLER, OF INDIANAPOLIS, INDIANA, ASSIGNOR TO ROBERT H. HASSLER, INC., OF INDIANAPOLIS, INDIANA, A CORPORATION.

REBOUND CHECK.

Application filed December 27, 1924. Serial No. 758,453.

My invention has for its object to produce a simple, compact, efficient and durable rebound check which is adapted to be connected between two relatively movable members of an automotive vehicle chassis, and which will effectively retard the sudden recoil action of the main suspension springs, after they have been compressed. The principal object of this invention is to provide a rebound check of the one-way acting type, which can be mounted upon a vehicle chassis and connected by a flexible strap to the axle so that said vehicle will be free to move downwardly as the springs compress. When rebounding from a compressed position, the flexible strap is drawn taut and cooperates with a friction device thereby preventing a rapid upward movement of the spring suspended parts, because a predetermined resistance set up by the friction device must first be overcome.

The principal feature of the invention resides in a friction ring construction whereby the force or strain to which the shock absorber is subjected, is exerted upon the friction creating members.

Another feature of the invention resides in the fact that the usual center or hub bearing has been dispensed with and such work as is usually imposed on these members, has been distributed to other parts of the device, such as the friction creating members, in order to simplify the construction and to reduce the number of wearing parts. In other words, the parts employed to set up a restraining or frictional resistance, also constitute the hub or center bearing members.

Still another feature of the invention resides in the fact that the frictional members are provided with conical friction surfaces, one of which is inverted in respect to the other.

It is also the object to provide a rebound check which is simple in construction, strong and durable; which will not easily get out of order; which can be readily applied to vehicles already in use, or furnished as the regular part of the inital equipment thereof; which can be manufactured at a normal cost and which will operate efficiently to obtain the desired restraining effect.

The invention may be briefly summarized as consisting of certain novel details of constructions, combinations, and arrangements of parts which will be described in the specifications and pointed out in the appended claims.

Figure 9:
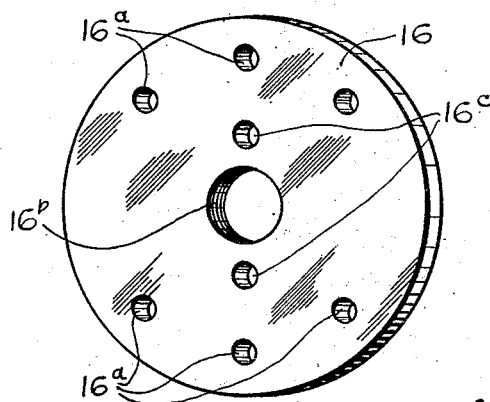
Figure 10:
Figure 13:
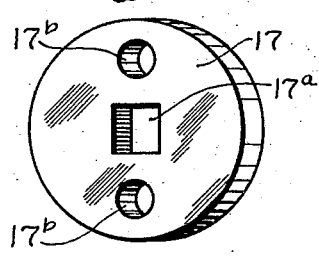
Figures 11, 12:
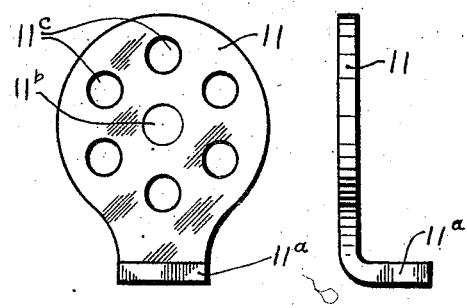
Figure 14:
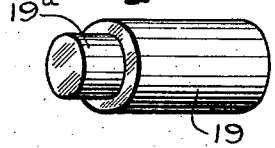
Figure 15:
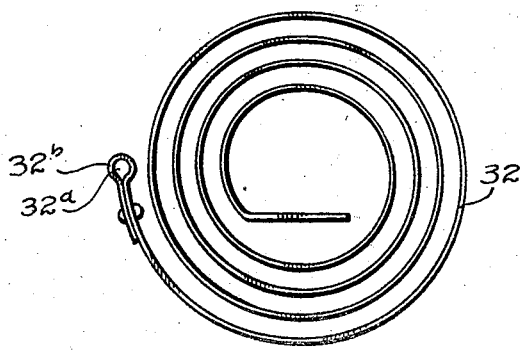
Figure 16:
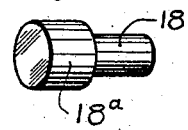

In the accompanying drawings, forming a part of the specifications, Figure 1 illustrates a full size cross sectional view of the rebound check, mounted on a fragment of a vehicle frame, showing the working parts therein, and is taken approximately on the line 1—1 in Fig. 2. Fig. 2 is a side elevation of Fig. 1. Figs. 3 to 13 inclusive are drawn at a reduced scale; Fig. 3 being a cross sectional view of the oscillating drum and parts which connect thereto. Fig. 4 is a side elevation of Fig. 3. Fig. 5 is a sectional view of the friction ring and Fig. 6 is a side view thereof. Fig. 7 is a side elevation of the center bolt, and Fig. 8 an end elevation thereof. Fig. 9 is a perspective view of the friction ring support. Fig. 10 is a side elevation of the compression spring. Fig. 11 is a side elevation of the frame fitting, and Fig. 12 an end elevation thereof. Fig. 13 is a perspective view of the spacer. Fig. 14 is an enlarged view of the frame fitting dowel pin. Fig. 15 is a side elevation of the spiral spring. Fig. 16 is an enlarged perspective view of the friction ring dowel pin.

Referring now to the drawings, 10 represents a fixed center bolt carrying a frame fitting 11 to which the rebound check is adapted to be secured to the frame 12 of the vehicle. The small end of the center bolt 10 is threaded so that when inserted in the frame member 12 it can be pulled tightly against a square portion $10^a$ of the bolt 10 by means of a securing nut 9. The frame fitting 11 is provided with an ear $11^a$ which is adapted to fit on the under side of the frame 12 to prevent rotation of the center bolt 10 and the fitting 11. $11^b$ represents an aperture formed in the central part of the fitting, and $11^c$ represents a plurality of apertures equidistantly spaced around the central aperture $11^b$.

Non-rotatably mounted on the center bolt 10 is a conical friction ring 14 which is supported by means of a supporting member 16. The member 16 is provided with a plurality of apertures $16^a$ into which are inserted dowel pins 18. These pins are provided with enlarged portions on one end thereof, indicated by the ordinal $18^a$, which are tightly fitted to and inserted in a series of blind holes $14^a$ provided in the friction ring 14. These pins, when inserted in place, prevent independent rotation of the friction ring 14 with respect to the supporting member 16. The member 16 has in its central portion one large screw-threaded aperture 16ᵇ and a pair of smaller diametrically opposed apertures 16ᶜ. The screw-threaded aperture 16ᵇ is adapted to mate with large external threads 10ᵇ provided on the bolt 10. An enlarged portion 10ᶜ of the bolt 10 forms an abutment against which the supporting member 16 is shouldered.

Interposed between the frame fitting 11 and the supporting member 16, a spacer 17 is mounted. The spacer is also provided with a large centrally located square aperture 17ᵃ, the latter being snugly fitted to a square portion 10ᵃ formed on the bolt 10. This spacer is also provided with apertures 17ᵇ—17ᵇ which are diametrically opposed, and are located the same distance from the center of the spacer as the apertures 11ᶜ and 16ᶜ are located from the centers of the members 11 and 16 respectively. 19—19 represent cylindrical dowel pins which have small ends 19ᵃ that are adapted to register with apertures 16ᶜ—16ᶜ of the member 16. The large portion of the dowel pins are adapted to fit the apertures 17ᵇ—17ᵇ and 11ᶜ in the members 17 and 11 respectively, which pins lock members 11, 17 and 16 circumferentially, and also provide a plurality of positions to which the rebound check can be mounted on the frame fitting 11.

20 represents a conical friction cup which has provided therein a pair of conical friction surfaces; 20ᵃ indicates a small diameter surface and 20ᵇ a large diameter surface. It will be noted that the small conical surface 20ᵃ is inverted with respect to the large conical surface 20ᵇ. They are adapted to snugly engage with large and small conical surfaces 14ᵇ and 14ᶜ respectively which are formed on the friction ring 14; these conical surfaces are also inverted one with respect to the other. The friction cup 20 is maintained in constant pressure engagement against the friction ring 14 by means of a compression spring 22 which is mounted on the body portion of the cup 20 and is abutted against an enlarged head 10ᵉ of the bolt 10. As the bolt 10 is screwed into the supporting member 16, the spring is caused to exert a pressure against the friction cup 20. The outer periphery of the friction cup 20 is outwardly disposed and forms a circular flange 20ᶜ.

24 represents a cylindrical drum which is mounted on the friction cup 20 by means of the flange 20ᶜ, and is secured thereon by means of a circular bead 20ᵈ which registers with a groove 24ᵃ formed in the drum 24. Rivet 26 so locks the cup 20 and the cylindrical drum 24 together that independent rotation of either is prevented. 28 represents a flexible strap which is wound on the outer surface of drum 24, one end of which is anchored thereon by means of rivets 30 and 26. 32 represents a spiral spring which is anchored at its inner extremity in a slot 10ᵈ provided in the head 10ᵉ of bolt 10. It is secured to the drum 24 at its outer extremity by means of a pin 34 which is inserted in an eye 32ᵃ of yoke 32ᵇ formed at the outer extremity of the spring. The drum 24 is provided with an inwardly disposed ear 24ᵇ, the central portion of which is provided with an aperture 24ᶜ. The yoke 32ᵇ straddles the ear 24ᵇ, and the pin 34 is inserted through the apertures 32ᵃ and 24ᶜ respectively.

To exclude road grit and foreign particles, I have provided a cup shaped cover 36 which fits snugly on a circular flanged portion 24ᵈ of the drum 24. This cover is provided with an annular bead 36ᵃ formed on the inner surface of the cylindrical portion, which snaps into a mating groove 24ᵉ formed in the flange 24ᵈ of the drum. A similar cup shaped cover 38 is provided for the inner side of the rebound check which faces the frame member. This cover is provided with a similar circular bead 38ᵃ which snaps into a mating groove 20ᵉ formed in the friction cup 20.

It will be observed from the above that all the friction creating parts are thoroughly encased, which assures the best operating conditions.

The torsion spring is so disposed that it tends constantly to wind up the strap upon the drum or flange. Therefore, when the main springs of the vehicle to which the device is attached, are compressed, the slack of the strap is taken up by the rebound check mechanism; the torsion spring being made with sufficient pulling capacity, and adjustable, so that it can be set to give sufficient pulling force to overcome the predetermined frictional resistance. As the regular action of the main spring occurs, it rotates the drum, the speed of which is retarded by means of the frictional drag which takes place between the friction creating members 14 and 20. The amount of frictional resistance set up by these friction members, depends upon the predetermined compressive strength of the coil spring which exerts a pressure in a direction which causes the friction surfaces to be compressed together.

The construction is such that the annular load or strains, exerted by the device, which are usually imposed on a central hub or bearing is carried directly by the friction members 14 and 20. The friction ring is of sufficient diameter to substantially reduce this annular load due to its relative position with respect to both the horizontal axis and the outer surface of the drum upon which the strap operates.

It has been found that when only the large friction surface is used, that the drum 20 tends to wabble, or rotate out of true with respect to vertical, when the strap exerts a sudden pull, but with my new and novel construction such tendencies are obviated, and the drum oscillates on a true plane with respect to its horizontal axis.

The friction ring is preferably made of hard wood impregnated with a special lubricating compound. This combination has been found to give excellent results, preserving the friction surfaces on both the friction ring and the cup member.

It is thus seen that the invention provides a simple, compact and durable construction requiring but comparatively few parts; one which will not easily get out of order; one which may be readily placed upon vehicles already in use; one in which the annular friction ring serves simultaneously as a friction member and a hub bearing to carry the strains incident to the work imposed on the rebound check when in operation on a vehicle.

While I have illustrated and described with particularity, only a single preferred form of my invention, I do not desire to be limited to the exact structural details thus illustrated and described; but intend to cover all forms and arrangements which come within the terms employed in the definition of my invention constituting the appended claims.

I claim:—

1. In a rebound check, an element which performs simultaneously the double function of a hub bearing and of a frictional member, said element being provided with a pair of conical surfaces, one inverted with respect to the other, and strap means for operating said rebound check.

2. In a rebound check, the combination of a rotatable frictionally-resisted drum having a pair of conical friction surfaces, therein, a friction ring adapted to engage with said conical surfaces, a flexible connecting member coiled on said drum, means to maintain tension on said flexible member, and means to maintain pressure between said drum and friction ring.

3. In a rebound check, the combination of a rotatable frictionally-resisted drum, a friction ring with a plurality of conical friction surfaces in engagement with said drum, a flexible connecting member coiled on said drum, means to maintain tension on said flexible member, and means to maintain pressure on said drum.

4. In a rebound check, the combination of a central supporting bolt, a friction ring non-rotatably mounted on said bolt, a rotatable frictionally-resisted drum mounted on said friction ring, a flexible connecting member coiled on said drum, a pressure spring mounted on said bolt for maintaining a pressure on one side of the drum, means for maintaining tension on said flexible member, said friction ring provided with a pair of conical friction surfaces.

In witness whereof, I have hereunto set my hand and seal at Indianapolis, Indiana, this fifteenth day of December, A. D. one thousand nine hundred and twenty-four.

ROBERT H. HASSLER. [L. S.]